(12) United States Patent
Honda et al.

(10) Patent No.: US 7,046,484 B2
(45) Date of Patent: May 16, 2006

(54) MAGNETIC HEAD SUPPORTING DEVICE HAVING DUMMY WEIGHT USED TO COINCIDE MASS AND SWING MOVEMENT CENTERS

(75) Inventors: Takashi Honda, Tokyo (JP); Katsuki Kurihara, Tokyo (JP); Takeshi Wada, Tokyo (JP); Kaoru Matsushita, Osaka (JP); Hideki Kuwajima, Kyoto (JP)

(73) Assignees: TDK Corporation, Tokyo (JP); Matsushita Electric Industrial Co., Ltd., Kadoma (JP)

( * ) Notice: Subject to any disclaimer, the term of this patent is extended or adjusted under 35 U.S.C. 154(b) by 138 days.

(21) Appl. No.: 10/607,004

(22) Filed: Jun. 27, 2003

(65) Prior Publication Data

US 2004/0001287 A1    Jan. 1, 2004

(30) Foreign Application Priority Data

Jun. 28, 2002    (JP)    ............... 2002-189343

(51) Int. Cl.
  G11B 5/48    (2006.01)
  G11B 5/55    (2006.01)
  G11B 21/16    (2006.01)
  G11B 21/08    (2006.01)

(52) U.S. Cl. .................. 360/266.1; 360/265.7; 360/265.9; 360/244.2; 360/244.8; 360/245.1

(58) Field of Classification Search ............. 360/244.2, 360/244.8, 246.3, 265.7, 265.9, 245.1, 266.1
See application file for complete search history.

(56) References Cited

U.S. PATENT DOCUMENTS

| 5,640,290 A | 6/1997 | Khanna et al. |
| 6,751,064 B1 * | 6/2004 | Kuwajima et al. ....... 360/244.8 |
| 6,826,018 B1 * | 11/2004 | Kuwajima et al. ....... 360/254.3 |

FOREIGN PATENT DOCUMENTS

| EP | 1231598 A2 * | 8/2002 |
| EP | 1239485 A2 * | 9/2002 |
| JP | 8-102159 | 4/1996 |
| JP | 9-82052 | 3/1997 |
| JP | 2001-57032 | 2/2001 |

OTHER PUBLICATIONS

U.S. Appl. No. 10/607,004, filed Jun. 27, 2003, Honda et al.
U.S. Appl. No. 10/626,603, filed Jul. 25, 2003, Honda et al.

* cited by examiner

*Primary Examiner*—Craig A. Renner
(74) *Attorney, Agent, or Firm*—Oblon, Spivak, McClelland, Maier & Neustadt, P.C.

(57) ABSTRACT

An object of the present invention is to provide a hard disk drive or related apparatus in which a possibility of head crash can be reduced to minimum even if the apparatus receives an external impact during the operating state. To achieve the object, according to the present invention, in a suspension including a load beam to which a magnetic head slider is to be attached and a head arm continuously joined to the load beam, a dummy weight is attached to the rear end of the head arm, and a attachment position of a joining member for joining a portion including the magnetic head slider, the load beam, the head arm and the dummy weight with a swing portion of a voice coil motor is provided at a position in the vicinity of the center of mass of that portion.

14 Claims, 4 Drawing Sheets

MAGNETIC HEAD SUPPORTING DEVICE HAVING DUMMY WEIGHT USED TO COINCIDE MASS AND SWING MOVEMENT CENTERS

BACKGROUND OF THE INVENTION

1. Field of the Invention

The present invention relates to a suspension apparatus, a magnetic head apparatus, a head actuator and a magnetic recording apparatus, and particularly to a suspension apparatus, a magnetic head apparatus, a head actuator and a magnetic recording apparatus that have improved impact resistance in operating state.

2. Related Background Art

FIG. 6 is a drawing schematically showing a prior art magnetic recording apparatus. As shown in FIG. 6, the magnetic recording apparatus 101 is provided with a magnetic disk 102 serving as a rotatable magnetic recording medium and an actuator 104 for moving a magnetic head, which is floating (or hovering) above the magnetic disk 102, in a radial direction of the magnetic disk 102. The magnetic recording apparatus 101 is further provided with a movable coil 105 and a magnetic circuit 106, which constitute a voice coil motor (which will be referred to as a VCM hereinafter).

In the magnetic recording apparatus 101 having the above-described structure, a servo signal (i.e. position information) that has been written in the surface of the magnetic disk in advance is read by the magnetic head 103, and the magnetic head 103 is moved relative to the surface of the magnetic disk 102 based on the read information. Specifically, electric power is supplied to a movable coil 105 provided at the opposite end of the magnetic head 103, so that a force is generated in a magnetic circuit 106 in the directions indicated by an arrow 107. Thus, the magnetic head 103 is moved to a target track (or a target position).

FIG. 7 is a drawing schematically showing how the magnetic head apparatus is disposed in relation to the magnetic disk. As shown in this drawing, a load beam 109 is provided at the intermediate portion of the magnetic head 103. One end portion of the load beam 109 is secured to a base plate 108 that makes a junction with a head arm 115 in an actuator 104. On the other end portion of the load beam 109, there is provided a slider 110 attached thereto. In addition, an elastic spring portion is provided at the boundary 111 of the load beam 109 and the base plate 108.

In the process of writing information in the magnetic disk 102 with the above-described magnetic head, the magnetic disk 102 is rotated at several thousands revolutions per minute. The writing and other processes are performed under the state in which the rotation of the magnetic disk 102 is maintained. During that, the magnetic head 103 can be maintained in a state spaced apart from the magnetic disk 102 by a predetermined minute spacing in accordance with a balance between a pressure caused by air involved in the rotation of the magnetic disk 102 and a load exerted by a spring or other element (not shown) disposed on the actuator 104. This predetermined spacing thus maintained enable stable writing of information or other processes.

The capacity and recording density of hard disk drives have been increased rapidly, and hard disk drives with areal densities of more than 40 gigabits per square inch have been recently announced. In addition, the price of the hard disk drives per unit storage capacity has been reduced rapidly. In view of such situations, applications of hard disk drives other than conventional applications such as for servers or computers are contemplated. Specifically, applications as storage devices for digital still cameras or portable terminals such as cellular phones are contemplated.

Portable terminals including portable personal computers (which are sometimes called notebook sized personal computers) are required to be compact in the size and thickness and to be impact proof. However, generally speaking, the hard disk drive is vulnerable to impacts. This is because the magnetic head must maintain, as described in the above, a minute spacing from the magnetic disk rotating at a high rate during the process of writing information on the hard disk drive. In other words, if the hard disk drive receives an impact under an operating state such as writing, there is a considerable possibility that the magnetic head would collide with the magnetic disk that is rotating at a high rate to cause so-called head-crash.

As a solution for such a problem, Japanese Patent Application No. 9-82052 discloses, for example, a structure in which a load is given to an extension formed as a part extending from a load beam so that the center of impact acceleration created in a slider due to an externally applied impact would be shifted to the rotation center of the slider. Furthermore, Japanese Patent Application Laid-Open No. 8-102159 and No. 2001-57032 disclose a structure in which a limiter for limiting swing of a slider caused by an externally applied impact is provided with respect to the direction of the swing to reduce the amplitude of the swing movement. However, these solutions are directed to reduction of the swing that would be caused under conditions of ordinary use, but they cannot cope with situations, such as dropping of the hard disk drive to the ground or floor, which should be taken into consideration in the case of portable devices.

In other words, conventional hard disk drives have been designed under a presumption that they are used in a standstill state. Therefore, under the present circumstances, no consideration is made for behaviors of a magnetic head, a suspension and other parts of a hard disk drive on the occasion of receiving a strong impact.

SUMMARY OF THE INVENTION

The present invention has been made in view of the above-described situations. An object of the present invention is to provide a suspension, a magnetic head, a head actuator and a magnetic recording apparatus in which a risk of the head-crash is reduced to minimum, even when they receive a strong impact.

In view of the above-mentioned problems, according to the present invention, there is provided a magnetic head supporting mechanism or a suspension apparatus comprising a load beam adapted to be attached with a magnetic head slider at one end and a head arm, the tip end of the head arm being joined with the other end of the load beam, wherein a dummy weight is attached to the rear end of the head arm, the center of mass of a portion including all of the magnetic head slider, the load beam, the head arm and the dummy weight coincides with the center of swing movement of the head arm in a radial direction of a recording medium and with the center of swing movement of the head arm in a direction perpendicular to a recording surface of the recording medium.

Specifically, in the magnetic head supporting mechanism or the suspension apparatus according to the invention, the attachment position of a joining member for joining the portion including all of the magnetic head slider, the load beam, the head arm and the dummy weight with a swing portion of a voice coil motor would be arranged at a position in the vicinity of the center of mass of the portion including all of the magnetic head slider, the load beam, the head arm and the dummy weight, and said portion would be supported by a pivot pin at said center of swing movement of the head arm in the perpendicular direction.

In the above-described head supporting mechanism or the suspension apparatus, it would be preferable that the load beam and the head arm be joined in such a way that their center lines in the longitudinal direction coincides with each other, and the attachment position of the dummy weight and the attachment position of the joining member for joining the voice coil motor for swinging the head arm in the radial direction of the recording medium with the head arm be respectively arranged to be symmetrical with respect to said center line. In addition, it would be preferable that the load beam and the head arm be constructed as a single member. It would also be preferable that the load beam and the head arm be made of a resin.

Furthermore, in view of the above-mentioned problems, there is provided according to the present invention a magnetic head apparatus comprising a magnetic head slider, a load beam adapted to be attached with a magnetic head slider at one end, and a head arm, the tip end of the head arm being joined with the other end of the load beam, wherein a dummy weight is attached to the rear end of the head arm, the center of mass of a portion including all of the magnetic head slider, the load beam, the head arm and the dummy weight coincides with the center of swing movement of the head arm in a radial direction of a recording medium and with the center of swing movement of the head arm in a direction perpendicular to a recording surface of the recording medium.

Specifically, in the magnetic head apparatus according to the invention, the attachment position of a joining member for joining the portion including all of the magnetic head slider, the load beam, the head arm and the dummy weight with a swing portion of a voice coil motor would be arranged at a position in the vicinity of the center of mass of the portion including all of the magnetic head slider, the load beam, the head arm and the dummy weight, and said portion would be supported by a pivot pin at said center of swing movement of the head arm in the perpendicular direction.

In the above-described magnetic head apparatus, it would be preferable that the load beam and the head arm be joined in such a way that their center lines in the longitudinal direction coincides with each other, and the attachment position of the dummy weight and the attachment position of the joining member for joining the head arm with the voice coil motor for swinging the head arm in the radial direction of said recording medium be respectively arranged to be symmetrical with respect to said center line. In addition, it would be preferable that the load beam and the head arm be constructed as a single member. It would also be preferable that the load beam and the head arm be made of a resin.

Still further, according to the present invention, there is provided a head actuator comprising a magnetic head including a magnetic head slider, a load beam adapted to be attached with the magnetic head slider at one end and a head arm the tip end of which is joined with the other end of said load beam, and a swing portion of a voice coil motor having a support arm that swingably supports the magnetic head, wherein a dummy weight is attached to the rear end of the head arm, the head arm is joined with the support arm via a joining member, a portion including the magnetic head slider, the load beam, the head arm and the dummy weight is biased, at the center of mass of said portion, in a direction away from the support arm by a pivot pin provided on the support arm, so that said portion is supported in such a way that it is spaced from said support arm by a predetermined distance with its substantially horizontal state being maintained.

In the above-described head actuator, it would be preferable that the load beam and the head arm be joined in such a way that their center lines in the longitudinal direction coincides with each other, and the attachment position of the dummy weight, the attachment position of the joining member and the biasing position of the pivot pin be respectively arranged to be symmetrical with respect to said center line. It would be also preferable that the joining member be made of an elastic member. In addition, it would be preferable that the elastic member be a leaf spring having a U-like shape, the round portion and the end portions of the leaf spring be arranged along said center line, and the round portion be secured to either one of the support arm and the head arm, and the end portions be secured to the other one of the support arm and the head arm. It would also be preferable that the load beam and the head beam be constructed as a single member made of a resin.

Furthermore, in view of the above-described problems, a magnetic recording apparatus according to the present invention may be equipped with a magnetic head apparatus according to one of the above-described modes or a head actuator according to one of the above-described modes.

DETAILED DESCRIPTION OF THE PREFERRED EMBODIMENT (First Embodiment)

Figure 1:
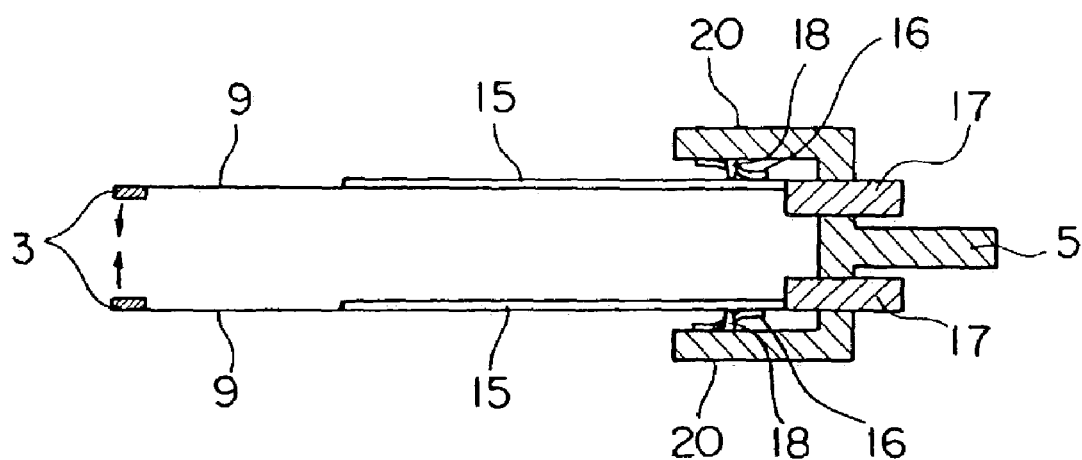
FIG. 1 is a cross sectional view schematically showing the principal portion of a magnetic disk apparatus according to a first embodiment of the present invention.
Figure 2:
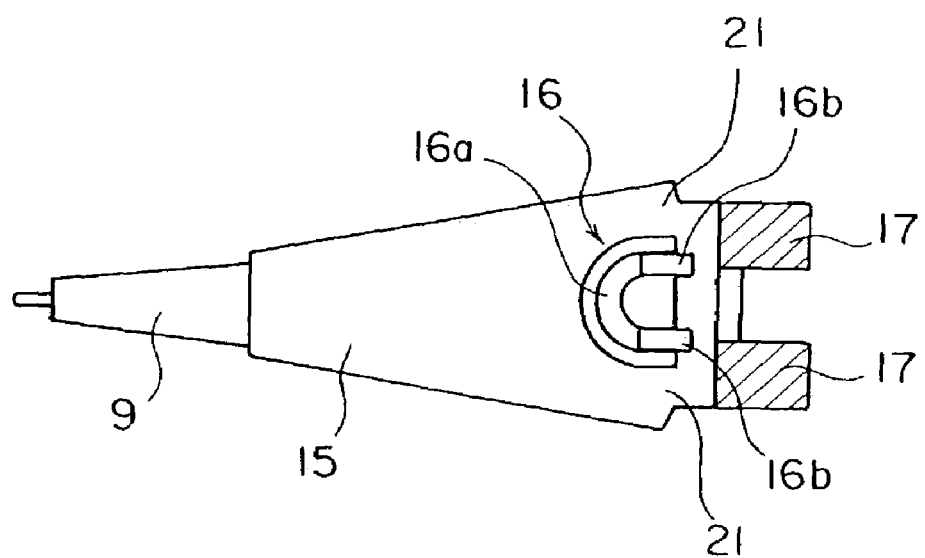
FIG. 2 is a top view showing the principal portion shown in FIG. 1.

FIG. 1 is a side view schematically showing the principal portion of a magnetic disk apparatus as a first embodiment of the present invention. FIG. 2 is a top view showing the same principal portion of the magnetic disk apparatus. The magnetic disk apparatus according to this example is an apparatus that is capable of writing information on both sides of a magnetic disk. In addition, in order to facilitate understanding of the invention, only the principal portion is illustrated in these drawings, and illustrations of a magnetic disk and components such as a flexure and a plate are omitted. In all of the drawings that will be referred to in the following, the same components will be designated by the same reference characters.

Referring to the drawings, at the tip end of each head arm 15, a load beam 9 is supported by the head arm 15 via a plate (which is not shown in the drawings). The load beam 9 is supported by the head arm 15 at one end thereof, and the load beam 9 supports a magnetic head slider 3 at the other end. The magnetic head slider 3 is so supported that a recording/reproducing element end (not shown) formed on the slider is opposed to a magnetic recording medium. Dummy weights 17 are attached to the rear end portion of the head arm 15. In the arrangement according to this embodiment, the load beam 9 and the head arm 15 are connected together in such a way that the center lines of them coincide with each other (i.e. they are coaxial).

The magnetic head slider 3, the load beam 9, the head arm 15 and the dummy weights 17 are supported, as an integral portion, by a swing portion 5 of a voice coil motor (VCM) (not shown). Specifically this integrated portion of the magnetic head slider 3 and other parts are supported by a support arm 20 extending from the swing portion 5 of the VCM via a leaf spring 16 having a U-like shape serving as a joining member provided on the head arm 15 at a position about the position of center of mass of the integrated portion including the above-mentioned magnetic head slider and other parts with respect to the longitudinal direction. In connection with this, the dummy weights 17 are provided as divided members so that they would not interfere with the arrangement of the support arm 20 and other parts and the weight (or mass) would be equally distributed with respect to the center line of the load beam 9 and the head arm 15.

On the support arm 20, there is provided pivot pins 18 for urging the integrated portion including the magnetic head slider and the other parts so that the integrated portion would be spaced apart from the support arm 20. The urging positions 21 of the pivot pins 18 are adapted to approximately coincide with the center of mass of the integrated portion including the load beam 9, the head arm 15 and the dummy weights 17 etc. with respect to the longitudinal direction and to correspond to portions located equidistant from the center line of the magnetic head slider and other parts. More specifically, the leaf spring 16 having a U-like shape is arranged in such a way that the round portion 16a at the center thereof is oriented to the tip end direction of the head arm 15 and the end portions 16b of the leaf spring 16 are oriented to the rear end direction of the head arm 15, so that the round portion 16a is fixed to the support arm 20 and the end portions 16b are fixed to the head arm 15.

With the above-described structure, the integrated portion including the magnetic head slider and other parts is supported at a position in the vicinity of its center of mass by the leaf spring 16 having a U-like shape in such a way that it is spaced apart from the support arm. Therefore, the integrated portion including the magnetic head slider and other parts is supported under a horizontally oriented state at any time. In other words, even when a strong impact is applied to the apparatus from the outside, the horizontally oriented state of the integrated portion including the magnetic head slider and other parts is maintained without a particular change and vibrated only in the vertical direction, since the center of mass of the portion including the load beam 9, head arm 15 and dummy weights 17 is coincide with the urging position 21 of the pivot pins 18.

If a reactive force created at the pivot pins 18 by the U-shape leaf spring 16 is sufficiently larger than a force created by a given impact acceleration and a weight of the integrated portion including the magnetic head slider and other parts, movement of the integrated portion including the magnetic head slider and other parts can be suppressed, so that the possibility of collision of the magnetic head slider and the magnetic disk can be reduced to minimum. In addition, if the rigidity of the head arm or other parts is sufficiently high in relation to an applied acceleration, deformation of the head arm or other parts with respect to the vertical direction can be suppressed satisfactorily. In this case, the possibility of the collision of the magnetic head slider and the magnetic disk can be further reduced.

In this embodiment, the U-shape leaf spring 16 is attached to the support arm 20 and the head arm 15 by spot welding or by using an adhesive. Thus, the positions at which the leaf spring 16 is attached to the respective arms are different in the horizontal direction. Therefore, a moment load will be generated about the pivot pins 18 in the rotation direction for causing the magnetic head slider to approach the surface of the magnetic disk.

In conventional structures, a magnetic head slider is biased toward the surface of a magnetic disk by an elastic spring portion provided between an arm head and a load beam. With the implementation of the present invention, the leaf spring that has been conventionally used may be omitted. The leaf spring conventionally used suffers from a risk that a rotational vibration of the magnetic head slider and other parts may be generated about the leaf spring, when an external impact is exerted. However, if the leaf spring is omitted, causes of such a vibration can be reduced.

In the structure according to this embodiment, the above-mentioned rotation moment is cancelled by adjustment of the weight of the dummy weights 17. On the other hand, it is also possible to increase or reduce the rotation moment by adjusting the weight of the dummy weights 17. When the center of mass of the magnetic head slider and other parts is fixed to a predetermined position, high precision assembling is generally required.

However, according to the present invention, it is possible to shift the center of mass to a predetermined position after assembling of the head slider and other parts to the VCM etc. if a structure that allows adjustment of the position or weight of the dummy weight(s) is additionally provided. Alternatively, if the pivot pins are adapted to be slidable on the support arm in the direction of the head arm, it is easy to adjust the pivot pins to support the center of mass. Therefore, with the present invention including the above-described structure, it is possible to facilitate efficiency of the assembling process of the hard disk drive.

The structure that is generally referred to as a suspension corresponds, in the present invention, to the portion composed essentially of the load beam, the head arm and the dummy weights. The structure referred to as a magnetic head corresponds to the portion composed of the suspension and the head slider etc. The structure referred to as a head actuator corresponds to the portion composed of the magnetic head and the VCM that are coupled together.

(Modification)

Figure 3:
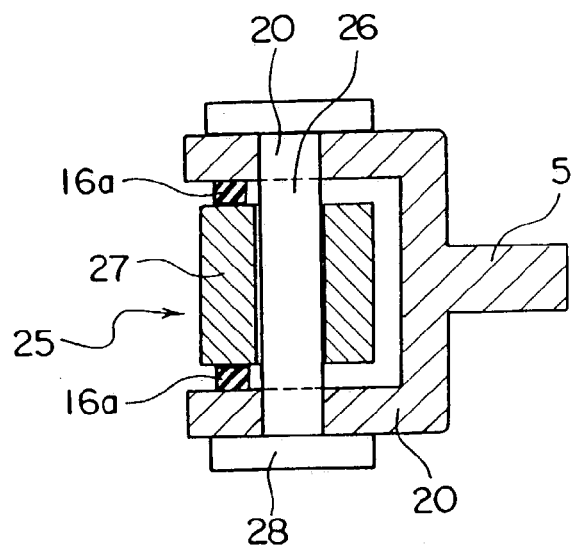
FIG. 3 is a drawing showing the general structure of a mount portion on a VCM (voice coil motor) according to a modification of the first embodiment.

A modification of the first embodiment will be described. In this modification, the leaf spring having a U-like shape is fixed to the support arm by a nut or the like. FIG. 3 is a drawing showing that fixed state, in which only the round portions 16a of the U-shape leaf springs are illustrated in the drawing for the sake of simplicity. The swing portion 5 of the VCM for swinging the head slider(s) and other parts is required to be supported by a rotation shaft 26 via a ring 25. Generally, the arm portion 20 of the swing portion 5 is fixed to a bearing case 27 that is rotatably supported by the rotation shaft 26 by a nut 28 or the like.

In this modification, the round portion 16a of the U-shape leaf spring 16 is disposed between the bearing case 27 and the arm portion 20, so that the round portion 16a is secured between them. The pivot pin 18 is provided on the arm portion 20 and the head arm, the dummy weights and the ends of the U-shape leaf spring are disposed in such a way that they do not interfere with the bearing case and the arm portion. With such a structure, the magnetic head slider and other parts can be easily attached to the VCM. Therefore, it is possible to enhance efficiency of the assembling process of the hard disk drive still more.

(Second Embodiment)

Figure 4:
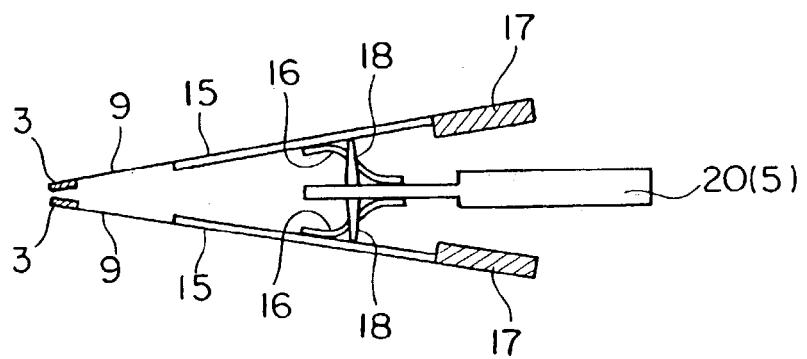
FIG. 4 is a cross sectional view schematically showing the principal portion of a magnetic disk apparatus according to a second embodiment of the present invention.
Figure 5:
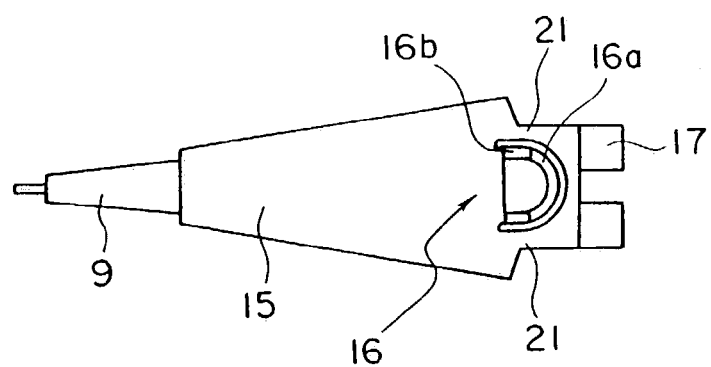
FIG. 5 is a top view showing the principal portion shown in FIG. 4.
Figure 6:
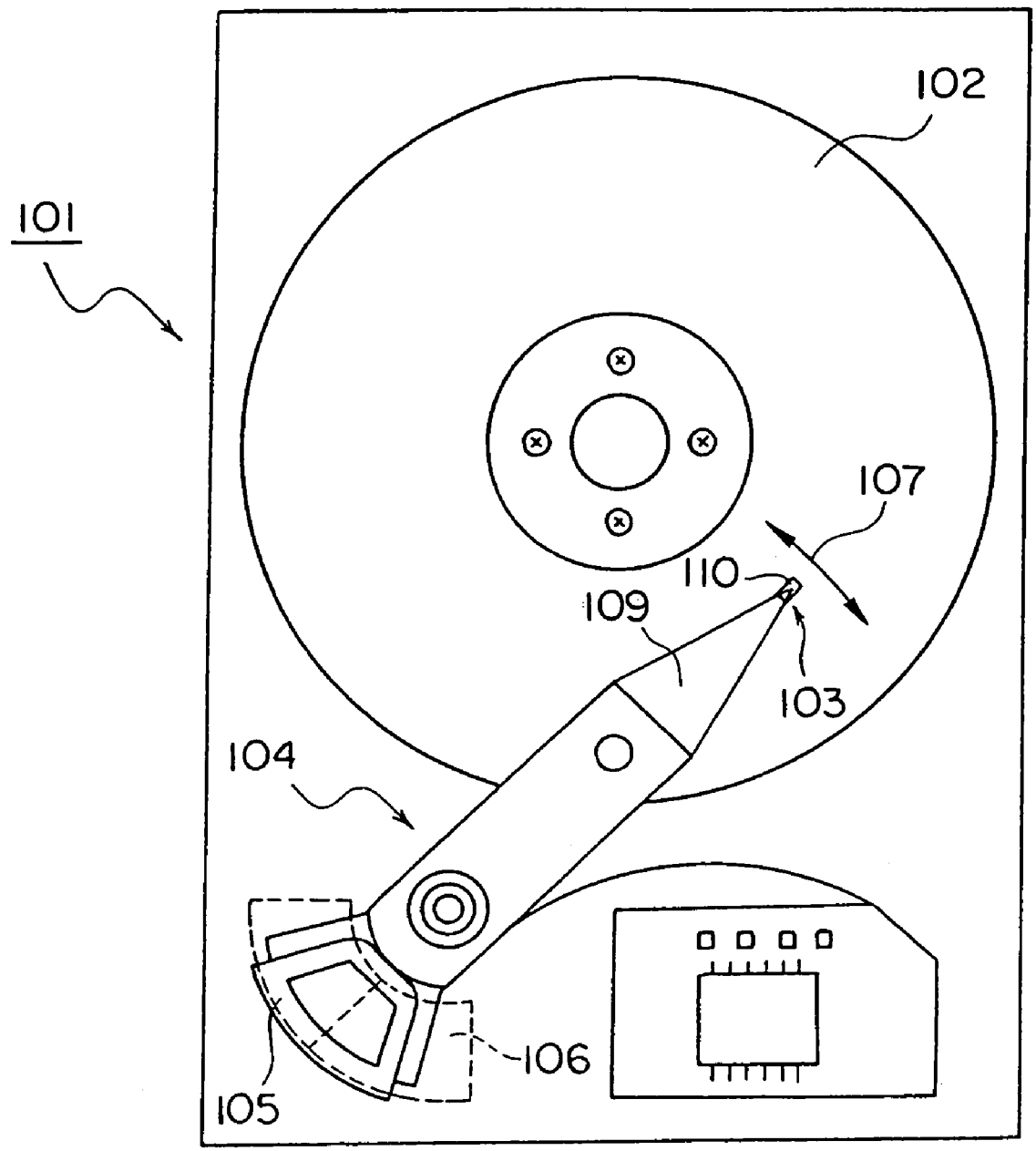
FIG. 6 is a drawing schematically showing the structure of a conventional magnetic recording apparatus.
Figure 7:
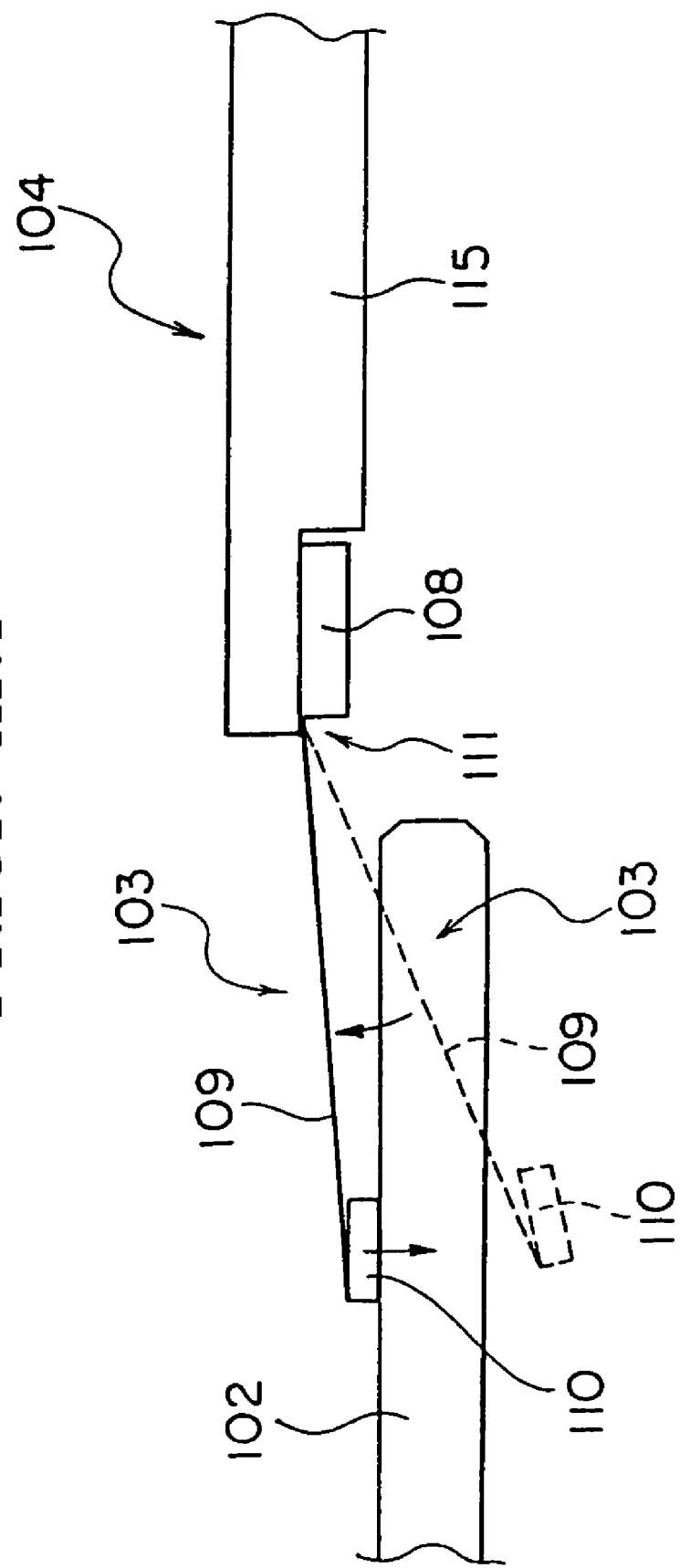
FIG. 7 is a drawing for illustrating how the magnetic head apparatus is disposed in relation to the magnetic disk.

FIG. 4 is a cross sectional view schematically showing the principal portion of a magnetic disk apparatus as a second embodiment of the present invention. FIG. 5 is a top view of the same principal portion. The magnetic disk apparatus according to this example is an apparatus that is capable of writing information on both sides of a magnetic disk. In addition, in order to facilitate understanding of the invention, only the principal portion is illustrated in these drawings, and illustrations of a magnetic disk and components such as a flexure and a plate are omitted.

The structure of this embodiment is the same as that of the first embodiment except for the arrangement of a support arm 20 and, in connection with this, the arrangement of leaf springs 16 having a U-like shape and pivot pins 18. Namely, the structure of magnetic head sliders 3, load beams 9, head arms 15 and dummy weights 17 are the same as the structure of the corresponding parts in the first embodiment. Therefore, the following specific description will be directed mainly to the portions that are different from those in the first embodiment.

In this second embodiment, a single support arm 20 is used, and each leaf spring 16 having a U-like shape is arranged in such a way that the round portion 16a at the center thereof is oriented to the rear end direction of the head arm 15 and the end portions 16b of the leaf spring 16 are oriented to the tip end direction of the head arm 15, so that the round portion 16a is fixed to the support arm 20 and the end portions 16b are fixed to the head arm 15. In addition, pivot pins 18 are provided on the support arm in such a way as to support the position 21 corresponding to the center of mass of the integrated portion including the magnetic head slider and other parts, as is the case with the first embodiment.

In this embodiment also, the positions at which the leaf spring 16 is attached to the respective arms 15 and 20 are different in the horizontal direction, as is the case with the first embodiment, so that the positions at which tensile forces are created are symmetrical with respect to the urging position of the pivot pins. Therefore, a moment load will be generated about the pivot pins 18 in the rotation direction for causing the magnetic head slider 3 to approach the surface of the magnetic disk.

The process for adjusting the position of the center of mass by means of the dummy weights is the same as that in the first embodiment, and the description thereof will be omitted. With the structure according to the second embodiment, it is possible to make the structure of the support arm of the VCM simple. Therefore, the assembling process can be made easier. In addition, the load to the VCM can be reduced.

As per the above, in the present invention, a dummy weight(s) is added to a magnetic head slider, a load beam and head arm etc. so that the integrated portion including these parts are connected to an arm at a position in the vicinity of its center of mass via an elastic member such as a spring, and these parts are supported at a predetermined position by a pivot pin. Thus, it is possible to provide a hard disk drive that can resist an external impact even during the operating state.

While in the above-described embodiments, the load beam and the head arm are described as separate parts, they may be formed as an integral part. Specifically; they may be formed by a material the same as the material of the leaf spring having a U-like shape and the portion of the U-like shape may be formed by punching. Alternatively, the load beam and the head arm may be integrally molded with a resin and the leaf spring having a U-like shape may be attached to it. In the case in which the load beam and other parts are integrally molded, it is preferable that they are made of a lightweight material that has high rigidity and high vibration damping ability.

While in the above-described embodiments, a leaf spring having a U-like shape serving as an elastic member is used as a joining member for joining the support arm with the magnetic head slider and other parts, the shape of the leaf spring is not limited to this. In other words, the shape of the leaf spring may be modified in various ways. For example, it may be of a circular shape and portions (or a specific portions) of it may be secured to the support arm and the head arm. Furthermore, the leaf spring may be replaced by various elastic members such as a coil spring or a rubber member. In that case, there is no limitation for the shape and arrangement of such an elastic member as long as a pivot pin(s) can be so arranged that it can support the magnetic head and other parts at a position in the vicinity of the center of mass without difficulties. The joint member may be formed integrally with the head arm or the support arm.

While in the above-described embodiment, the pivot pins are provided on the support arm, they may be provided on the head arm. In that case, the pivot pins would be produced easily by press working etc. with a high degree of flatness. It is preferable that the pivot pins, which determine the distance between the head arm and the support arm, be made of a material having stiffness or rigidity such as a metal. However, from the standpoint of impact resistance, a resin or the like having high vibration damping ability may also be preferably used as the material for the pivot pins, or coating may be applied on the surface of the pivot pins with a resin or the like. In addition, while in the above-described embodiments, the pivot pins are provided on one side of each head arm, they may be provided on both sides. In that case, the pivot pin(s) on one of the sides functions to urge (or bias) the head arm and the pivot pin(s) on the other side serves as a limiter for vibration of the magnetic head slider and other parts, when they vibrate.

With implementation of the present invention, it is possible to provide a suspension, a magnetic head, a head actuator and a magnetic recording apparatus in which a risk of head-crash can be reduced to minimum even if they receives a strong external impact under the operating state.

What is claimed is:

1. A head supporting mechanism or a suspension apparatus comprising:
   a load beam adapted to be attached with a magnetic head slider at one end;
   a head arm, a tip end of said head arm being joined with the other end of said load beam; and
   a dummy weight which is attached to a rear end of said head arm so as to make a center of mass of a portion including all of said magnetic head slider, said load beam, said head arm and said dummy weight coincide with a center of swing movement of said head arm in a radial direction of a recording medium and with a center of swing movement of said head arm in a direction perpendicular to a recording surface of said recording medium.

2. A head supporting mechanism or a suspension apparatus according to claim 1, wherein said load beam and said head arm are joined in such a way that center lines of said load beam and said head arm in the longitudinal direction substantially coincide with each other, and attachment positions of said dummy weight are respectively arranged to be symmetrical with respect to said center lines, and attachment positions of a joining member for joining a voice coil motor for swinging said head arm in the radial direction of said recording medium with said head arm are also respectively arranged to be symmetrical with respect to said center lines.

3. A head supporting mechanism or a suspension apparatus according to claim 1, wherein said load beam and said head arm are constructed as a single member.

4. A head supporting mechanism or a suspension apparatus according to claim 2, wherein said load beam and said head arm are constructed as a single member.

5. A head supporting mechanism or a suspension apparatus according to claim 1, wherein said load beam and said head arm are made of a resin.

6. A head supporting mechanism or a suspension apparatus according to claim 2, wherein said load beam and said head arm are made of a resin.

7. A magnetic head apparatus comprising:
a magnetic head slider; a load beam adapted to be attached with said magnetic head slider at one end;
a head arm, a tip end of said head arm being joined with the other end of said load beam; and
a dummy weight which is attached to a rear end of said head arm so as to make a center of mass of a portion including all of said magnetic head slider, said load beam, and said head arm and said dummy weight coincide with a center of swing movement of said head arm in a radial direction of a recording medium and with a center of swing movement of said head arm in a direction perpendicular to a recording surface of said recording medium.

8. A magnetic head apparatus according to claim 7, wherein said load beam and said head arm are joined in such a way that center lines of said load beam and said head arm in the longitudinal direction coincide with each other, and attachment positions of said dummy weight are respectively arranged to be symmetrical with respect to said center lines, and attachment positions of a joining member for joining a voice coil motor for swinging said magnetic head slider in the radial direction of said recording medium with said head arm are respectively arranged to be symmetrical with respect to said center lines.

9. A magnetic head apparatus according to claim 7, wherein said load beam and said head arm are constructed as a single member.

10. A magnetic head apparatus according to claim 8, wherein said load beam and said head arm are constructed as a single member.

11. A magnetic head apparatus according to claim 7, wherein said load beam and said head arm are made of a resin.

12. A magnetic head apparatus according to claim 9, wherein said load beam and said head arm are made of a resin.

13. A magnetic recording apparatus equipped with a magnetic head apparatus according to claim 7.

14. A magnetic recording apparatus equipped with a magnetic head apparatus according to claim 8.

* * * * *

UNITED STATES PATENT AND TRADEMARK OFFICE
CERTIFICATE OF CORRECTION

PATENT NO. : 7,046,484 B2 Page 1 of 1
APPLICATION NO. : 10/607004
DATED : May 16, 2006
INVENTOR(S) : Honda et al.

It is certified that error appears in the above-identified patent and that said Letters Patent is hereby corrected as shown below:

On the title page, Item (75), the Inventor Information is incorrect. Item (75) should read:
-- (75) Inventors: Takashi Honda, Tokyo (JP);
　　　　　　　　　Katsuki Kurihara, Tokyo (JP):
　　　　　　　　　Takeshi Wada, Tokyo (JP):
　　　　　　　　　Kaoru Matsuoka, Osaka (JP);
　　　　　　　　　Hideki Kuwajima, Kyoto (JP)--

Signed and Sealed this

Fourteenth Day of November, 2006

JON W. DUDAS
*Director of the United States Patent and Trademark Office*